(No Model.)
G. W. BEDBURY.
CAR AXLE.
No. 317,706. Patented May 12, 1885.
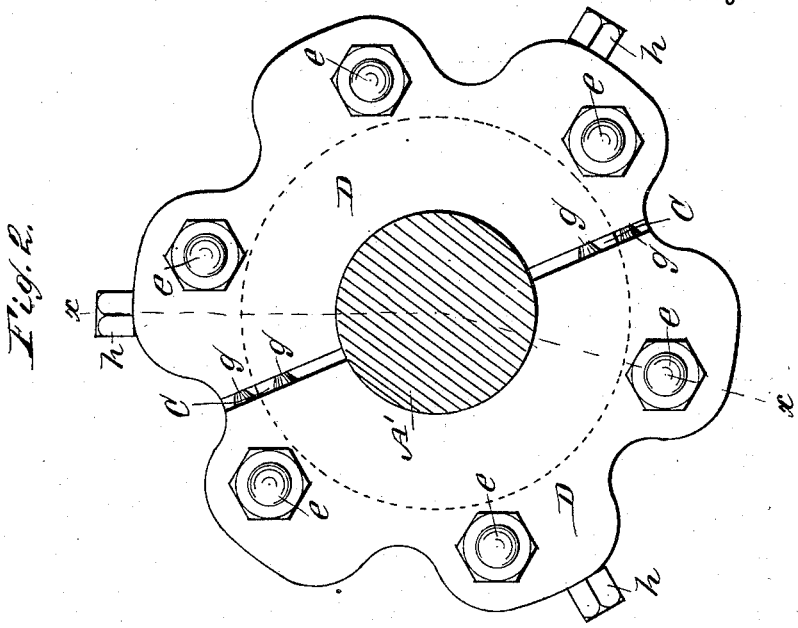
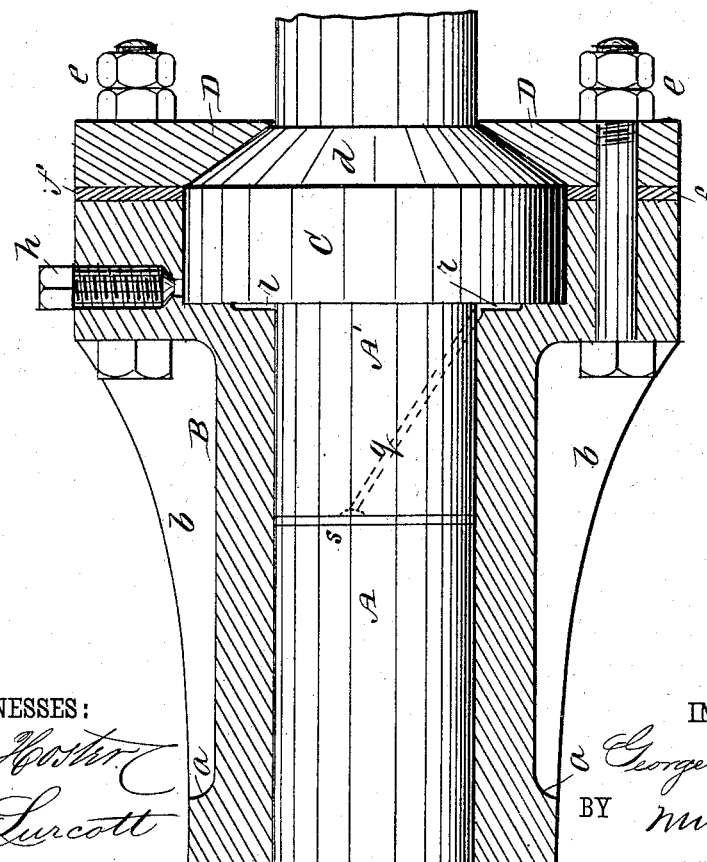
WITNESSES:
INVENTOR:
George W. Bedbury
BY
ATTORNEYS.
N. PETERS. Photo-Lithographer, Washington, D. C.

UNITED STATES PATENT OFFICE.

GEORGE WASHINGTON BEDBURY, OF PORTLAND, OREGON, ASSIGNOR TO JONATHAN BOURNE, JR., OF SAME PLACE.

CAR-AXLE.

SPECIFICATION forming part of Letters Patent No. 317,706, dated May 12, 1885.

Application filed September 16, 1884. (No model.)

*To all whom it may concern:*

Be it known that I, GEORGE W. BEDBURY, of Portland, in the county of Multnomah and State of Oregon, have invented a new and Improved Car-Axle, of which the following is a full, clear, and exact description.

My improvements relate to divided car-axles; and the invention consists in a novel construction of the hub for connecting and holding the ends of the two axles, as hereinafter described and claimed.

Reference is to be had to the accompanying drawings, forming a part of this specification, in which similar letters of reference indicate corresponding parts in both the figures.

Figure 1 is a longitudinal section of my improved hub as applied to a divided axle, said section being taken on the line $x\,x$ of Fig. 2. Fig. 2 is a face view of the same with the axle in section.

A A' are the ends of the divided axle.

B is the tubular hub, shrunk or otherwise rigidly attached upon the axle end A, and receiving at its outer end the axle A'.

$a$ is a bead formed around the socket, and $b$ are knee-braces for strengthening the hub. The outer end of the hub is enlarged to form a recess that receives a collar, C, that is attached around the axle A', and the outer face of the collar is beveled at $d$.

D is a divided ring, beveled at the edges of its aperture to fit snugly upon the beveled surface $d$ of the collar, and this ring D is attached to the hub by means of bolts $e$, so as to hold the collar, and thereby retain the axle A' in place. Between the ring D and the hub is a packing, $f$.

As shown in Fig. 2, the two parts of the divided ring D are slightly separated, and the edges are provided with lugs $g\,g$ for retaining in place a packing of rubber or any other suitable material.

In the outer end of the hub B holes are bored for supplying oil to the bearing-surface, and in these holes screws $h$ are tapped, to prevent escape of the oil, these screws being removed when the journal is to be oiled. At $q$ on the inner surface of the hub is an inclined groove connecting with an annular recess, $r$, so that the two act in connection with each other to distribute the oil over the whole surface of the journal.

Between the ends of the two axles A A' is a packing or washer, $s$, of metal, wood, leather, or other material, for filling the space and compensating for wear on the beveled surfaces of the collar C and the ring-plate D.

Having thus described my invention, I claim as new and desire to secure by Letters Patent—

1. The combination, with the divided axle A A', having the beveled collar C shrunk thereon, of the hub B, with its enlarged outer end fitting over the inner cylindric portion of said collar, and the annular plate D, fitted upon the beveled surface of said collar, and bolts $e$, connecting said hub and plate together, substantially as and for the purpose set forth.

2. The combination, with the axle A A', having a collar, C, of the divided plate D, with the opposite edges or surfaces of its two parts formed with separating and packing-securing studs $g$, substantially as and for the purpose set forth.

3. In a divided car-axle, the hub B, formed with the oil-groove $q$, recess $r$, and radial oil-holes provided with screw-plugs $h$, as shown and described.

GEORGE WASHINGTON BEDBURY.

Witnesses:
C. R. HOLCOMB,
L. H. WHEELER.